UNITED STATES PATENT OFFICE.

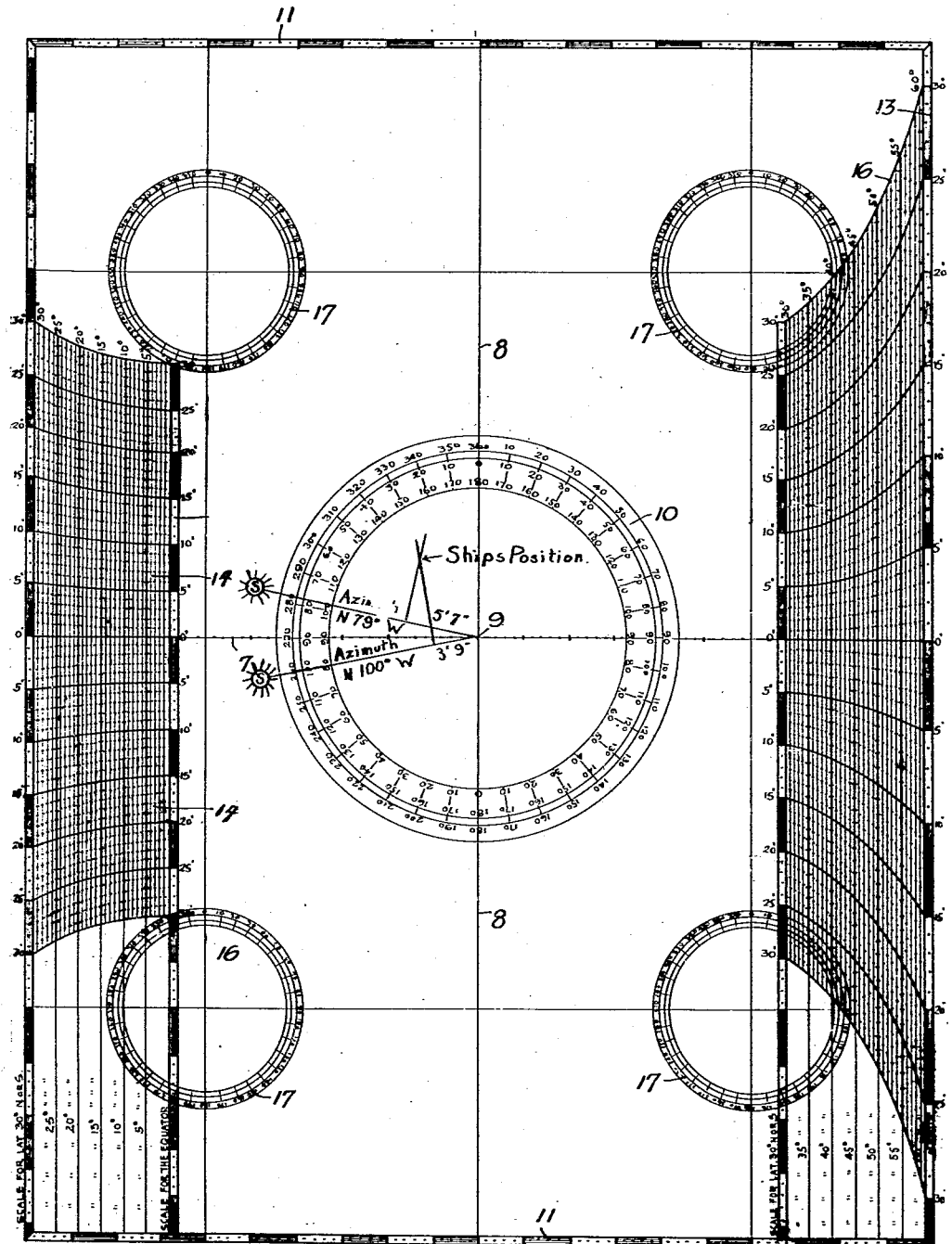

FRITZ E. UTTMARK, OF NEW YORK, N. Y.

SHIP'S-POSITION-PLOTTING CHART.

1,337,168.　　　　Specification of Letters Patent.　　Patented Apr. 13, 1920.

Application filed April 13, 1918. Serial No. 228,462.

*To all whom it may concern:*

Be it known that I, FRITZ E. UTTMARK, a citizen of the United States, and a resident of the city of New York, borough of Manhattan, county and State of New York, have invented a new and Improved Ship's-Position-Plotting Chart, of which the following is a full, clear, and exact description.

Among the principal objects which the present invention has in view are to enable a navigating officer to find his position from observations, to manipulate the navigating chart with despatch and relative ease, to avoid the use of a number of large charts such as are now generally used for finding a ship's position, and to simplify the operation of plotting the ship's position when using the Sumner lines. Navigating marine vessels as now generally practised is based on the "*New Navigation*" according to the method developed by Admiral Marcq Saint-Hilaire and which may be used with observations made at any time with good and consistent results and which is applicable to all conditions and is available regardless of azimuth, altitude or hour angle.

With these and other objects in view, the invention consists of certain novel features of construction, as hereinafter shown and described and then specifically pointed out in the claims.

A practical embodiment of the invention is represented in the accompanying drawing forming a part of this specification, in which the figure is a face view of the improved chart.

The chart, hereinafter more fully described in detail, is used to plot thereon the construction lines for finding a ship's position at a given time, and the result obtained may be transferred to a regular map to indicate the true position of the ship at such time. The chart has printed thereon an equatorial line 7 and a zero meridian line 8, which lines intersect at a right angle at the center of the chart to form an assumed location 9. The location 9 forms the center of a compass diagram 10. The compass diagram 10 is divided to furnish a series of scales for measuring the angles between the planes of different observations. Two of the scales show measurements to 180° from diametrically opposite positions so that the angles may be read north or south, said scales operating as proving members each for the other.

The chart is provided with marginal scales 11, 12, 13 and 14, of which the scales 11, 12 are bottom and top longitude scales and serve as a base and are equal in length to the latitude scale on the equatorial line 7. The scales 13 and 14 are latitude scales, and it will be noticed that, instead of the latitude scale of the Mercator projection with the degrees arranged end to end in a continuous line, the degrees for latitude in the improved chart are arranged one alongside the other in spaced relation from 60° north to 60° south. The scale 13 on the right hand side of the chart ranges from 30° to 60° north and south, and the other scale 14 ranges from the equator to 30° north and south. It is understood that instead of using the twelve cumbersome Hydrographic Office plotting sheets, aggregating about 200 square feet, a single, comparatively small chart is provided. On the chart, at four convenient locations thereof, are auxiliary protracting rings 17 which are used when the ship's position by dead reckoning is far out of the way of its true position.

In using the chart for plotting thereon the ship's position, the navigator proceeds as follows: The ship's position is assumed to be in the center of the compass diagram 10 by dead reckoning and from this center 9 is drawn an azimuth line according to a first sight or observation (assumed to be N. 100° W.), and along this azimuth line, beginning at the center 9, is marked off the intercept, (that is, the difference in minutes of arc between a computed and the observed altitude of a heavenly body in this case assumed to be 3' 9") and a perpendicular line is erected at this point thereby providing the first Sumner line, as shown in the drawing. To the dead reckoning position at the first sight or observation is applied the course and distance run (say 22 miles) during the interval (about 2 hours and 12 minutes) with a view to obtain a dead reckoning position at the second sight or observation (assumed to be N. 79° W.). The center of the compass diagram is again considered as the ship's position by dead reckoning at the second observation and from the center is drawn a corresponding second azimuth line on which is marked off the intercept (assumed to be 5' 7") and the second Sumner line is erected at this point, as shown in the drawing. The two Sumner lines intersect and the point of intersection is the correction to the ship's position. The result can now be readily transferred, if desired, to a regular map to indicate the ship's true position thereon at the second observation (latitude 39° 02′ 30″ N., longitude 72° 29′ 00″ W.).

Having thus described my invention, I claim as new and desire to secure by Letters Patent:—

1. A chart having imprinted thereon an equatorial line and a zero meridian line, the said lines intersecting one the other at a right angle, a compass diagram printed on the said chart and having its center coinciding with the point of intersection of the said lines, marginal latitude scales printed at the sides of the chart, and longitude scales printed at the top and bottom of the chart.

2. A chart having imprinted thereon an equatorial line and a zero meridian line, the said lines intersecting one the other at a right angle, a compass diagram printed on the said chart and having its center coinciding with the point of intersection of the said lines, marginal latitude scales printed at the sides of the chart, one of the said latitude scales representing latitude from the equator to latitude 30° north or south, and the other representing latitudes from 30° north or south to 60° north or south, and longitude scales printed at the top and bottom of the chart.

3. A chart having imprinted thereon an equatorial line and a zero meridian line, said lines intersecting one the other at a right angle, a compass diagram printed on the said chart and having its center coinciding with the point of intersection of the said lines, marginal latitude scales printed at the sides of the chart, one of the said latitude scales representing latitudes from the equator to latitude 30° north or south and the other representing latitudes from 30° north or south to 60° north or south, and longitude scales printed at the top and bottom of the chart, the degree lines being arranged one along side the other in spaced relation.

FRITZ E. UTTMARK.